INVENTOR.
ADRIAN K. DORSMAN
AGENT

Aug. 1, 1961  A. K. DORSMAN  2,994,840
MAGNETIC PULSE WIDTH MODULATOR
Filed Jan. 24, 1958  2 Sheets-Sheet 2

INVENTOR.
ADRIAN K. DORSMAN
BY
*Edward A. Sokolski*
AGENT

United States Patent Office 2,994,840
Patented Aug. 1, 1961

2,994,840
MAGNETIC PULSE WIDTH MODULATOR
Adrian K. Dorsman, Whittier, Calif., assignor to
North American Aviation, Inc.
Filed Jan. 24, 1958, Ser. No. 711,017
3 Claims. (Cl. 332—12)

This invention relates to pulse width modulators and more particularly to a pulse width modulator utilizing a saturable reactor multivibrator.

A modulator may be defined as a device for varying a particular characteristic of a wave, known as the carrier, as a function of another wave known as the modulating signal. In a pulse width modulator, the carrier wave is generally a square wave, and the modulating signal is used to vary the time duration of the individual square wave pulses as a function of the modulating signal amplitude. Various types of pulse width modulators utilizing magnetic cores are described in the literature. Some of these require accurately matched magnetic cores or well balanced diode networks to properly route the various signals. Most require a separate square wave generator apart from the modulation circuitry to generate the carrier wave. Others have the disadvantages of uncontrolled core reset, that is, residual magnetism effects in the core which appear in the output signals. In many of these devices, frequency response is poor due to the fact that they have only half cycle response, that is, saturation in only one direction is utilized. Numerous pulse width modulators have been described which utilize a triangular or sawtooth wave to trigger a switch. These all share the common disadvantage of requiring an accurate external function generator and are generally subject to false triggering in the presence of noise.

This invention overcomes all of the above-enumerated disadvantages and combines in a simple, easily constructed, low cost device having a small number of parts and excellent ruggedness, a versatile and accurate pulse width modulator. The device is completely self-contained requiring no external signal or pulse generator. Only one magnetic core is utilized and no diode matrix of any form is necessary so that inaccuracies due to mismatch of these parts are completely avoided. There is essentially no drift within the circuit since the core is always driven to saturation on each half cycle and the total change in flux is the same for each half cycle. The actual saturation level is not critical so temperature effects are negligible. There is essentially no delay in this circuit since the width of the pulse is a function of the integral of the voltage applied to it during the period of the pulse rather than the voltage applied during the previous half cycle. This avoids the inherent lag of the so-called half cycle response circuits.

The device of this invention utilizes a free-running saturable reactor multivibrator. The time duration of conduction of each of the electronic valves used in the multivibrator circuit are varied as a function of a modulating voltage in inverse relationship, that is, one increases in time duration of conduction in response to the modulating signal, while the other decreases in such response and vice versa. It can thus be seen that the output will consist of square waves whose positive and negative half cycles vary in width in accordance with the modulating signal, the positive half cycle widths increasing while the negative half cycle widths are decreasing and vice versa.

The device of this invention provides a simple low cost means for obtaining this end result with precision accuracy.

It is therefore an object of this invention to provide an improved pulse width modulator.

It is another object of this invention to provide a pulse width modulator utilizing a saturable reactor multivibrator having greater accuracy and temperature independence.

It is still another object of this invention to improve the performance of magnetic pulse width modulators.

It is a further object of this invention to eliminate the requirement for precision parts and complicated circuitry in a pulse width modulator without sacrificing precision accuracy.

It is a still further object of this invention to simplify construction and eliminate the necessity for external signal generators in precision pulse width modulators.

Other objects of this invention will become apparent from the following description taken in connection with the accompanying drawings, in which FIG. 1 is a schematic diagram of a first embodiment of the invention;

Figure 2:
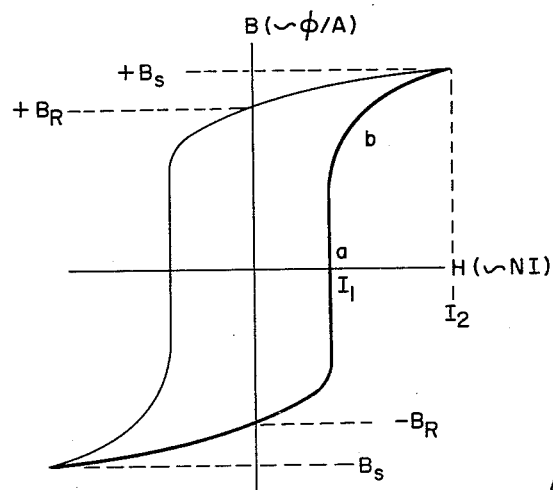
FIG. 2 is a diagram of a square wave hysteresis loop of a typical core which can be used in the device of this invention.

Referring to FIG. 2 which shows a hysteresis loop of a typical core which can be used in the saturable reactor of the device of the invention, the positive sauration level of this core is identified by $+B_s$, while the negative saturation level of the core is identified by $-B_s$. The saturation levels (both positive and negative) are defined as that flux density a further increase of which requires an extremely large value of magnetizing force H and thus a high value of magnetizing current since H is proportional to this current. Positive saturation is saturation caused by magnetizing current flow in one predetermined direction, while negative saturation is saturation caused by magnetizing current flow in the opposite direction. If a voltage $e(t)$ is applied to a winding on such a magnetic core, the change in flux level in the core obeys Faraday's law, (1) $$\Delta\phi = \frac{1}{N_x}\int_0^T e(t)\,dt \times 10^8 \text{ maxwells}$$

where $N_x$ is the number of turns in the winding and T is the period of one half cycle of voltage $e(t)$.

If a square wave voltage of amplitude $E_x$ is applied to the windings on the core whose hysteresis loop is represented in FIG. 2 so that the core is driven alternately between the limits $+B_s$ and $-B_s$ Equation 1 becomes:

(2) $$\Delta\phi = 2\phi_s = \frac{1}{N_x}\int_0^T E_x\,dt \times 10^8$$

(3) $$= \frac{E_x T}{N_x} \times 10^8 \text{ volt seconds}$$

solving for T there results:

(4) $$T = \frac{2\phi_s N_x}{E_x} \times 10^{-8} \text{ seconds}$$

where $2\phi_s$ is the total change in flux in time T, $E_x$ is the voltage level of the square wave, $N_x$ is the number of turns in the winding, and T is the period of one half cycle.

Figure 1:
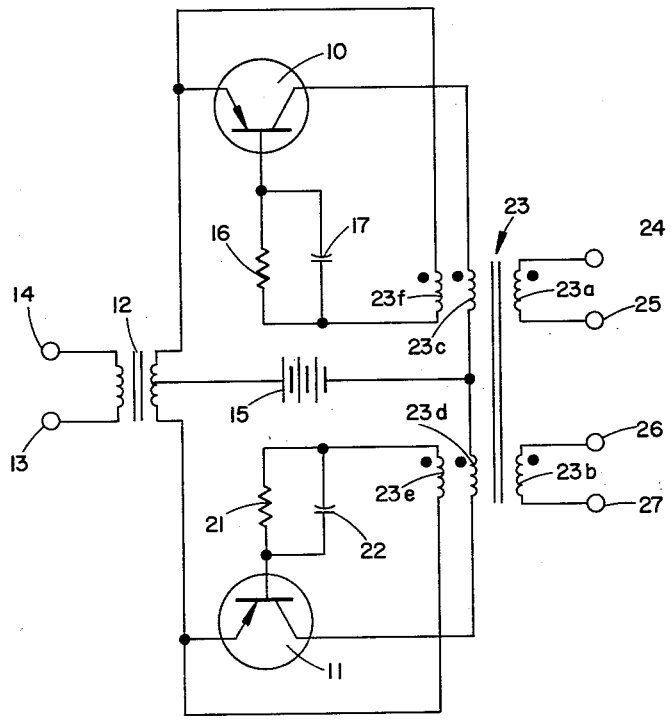

Referring now to FIG. 1 which is a schematic diagram of a first embodiment of the invention, transformer or saturable reactor 23 has control windings 23c and 23d, output windings 23a and 23b, and feedback windings 23e and 23f. Direct-current source 15 is connected so that its positive terminal is at the center tap of input transformer 12 and its negative terminal is attached to the connection between control windings 23c and 23d. The other ends of each of these control windings are separately connected to the collectors of transistors 10 and 11, respectively. The emitter electrodes of each of these transistors are respectively connected to the opposite ends of the secondary of input transformer 12. The emitter electrodes of each of these transistors are also connected respectively through feedback windings 23f and 23e and parallel resistor-capacitor networks formed by resistor 16 and capacitor 17 and resistor 21 and capacitor 22 to the bases of the same transistors. Modulating signals are fed to the primary of transformer 12 through terminals 13 and 14. Separate output signals appear between terminals 24 and 25 and between terminals 26 and 27. The collector of transistor 10 is connected through winding 23c to the negative terminal of direct-current source 15 while the collector of transistor 11 is connected through winding 23d to this same point.

Transformer 23 should have a core with a saturation characteristic approaching that shown in FIG. 2. None of the parts utilized need be held to critical tolerances. Ten percent resistors and capacitors, commercial type transistors and a magnetic core with saturation levels and other characteristics within 10 percent will function quite adequately. The number of windings on the core for any particular design requirement should be held within a fraction of one percent for precision accuracy, but this requirement may be relaxed where application demands are not particularly stringent.

To describe the operation of the circuit, let us assume that the modulating voltage input at terminals 13 and 14 is zero and that there is an open circuit between the negative terminal of current source 15 and its common connection to windings 23c and 23d. If we now connect the negative terminal of current source 15 to control windings 23c and 23d, a small current will flow through the transistors. One transistor will conduct slightly more than the other due to normal differences between the two. The difference between the currents in control windings 23c and 23d produces a net magnetizing force which is of the proper polarity to increase the current in the transistor with the larger initial current and decrease it in the other. This process is cumulative and continuous until one transistor is turned on fully while the other is strongly biased off. This may be explained as follows: Assuming that transistor 10 had the higher initial current, the full voltage output of current source 15 which we will call $E_x$ will now be impressed across winding 23c. The saturation resistance of transistor 10 and the resistances in the remainder of the path including the windings 23c and one half of the secondary of transformer 12 are very small with respect to the magnetizing impedance of winding 23c, so essentially the entire voltage $E_x$ is effective to drive the flux level in the core of transformer 23 toward saturation. Voltages of the same polarity will be induced in all the other windings as indicated in FIG. 1. The voltage across feedback winding 23f will hold transistor 10 in conduction while that across feedback winding 23e will keep transistor 11 cut off. It is seen that transistor 11 must block a voltage equal to $2E_x$ if we design winding 23c to be equal to winding 23d and 23e equal to winding 23f. This point in the operation is indicated in FIG. 2 by curve portion a—b. The magnetizing current is $I_1$.

Eventually the flux level in the core will reach the saturation level as indicated by $+B_s$ in FIG. 2, at which time the instantaneous magnetizing impedance will drop to a very low level. Simultaneously, the magnetizing current through winding 23c will rise to a high level such that the voltage drop in winding 23c and the current limiting action of transistor 10 will absorb the voltage generated by source 15. The current reaches the value $I_2$ indicated in FIG. 2, the flux saturation level having been attained. At this point the change in flux in the core is zero and therefore all induced voltages in the core will be zero. The base drive on transistor 10 will drop to zero causing this transistor to cut off and the magnetizing current to fall toward zero. With zero magnetizing force, the core flux will drop to the residual flux level $+B_R$ producing a sharp change in flux. This changing flux induces a voltage in all of the windings. The voltage induced in winding 23e is of the proper polarity to forward bias transistor 11 causing it to conduct while that in winding 23f is of a polarity to reverse bias transistor 10 and hold it at cutoff. Now, the same process as that described for transistor 10 will occur for the circuitry associated with transistor 11 and the output of direct-current source 15 will appear across winding 23d. Of course, the polarity of all induced voltages will be opposite to that shown for transistor 10 and the core of transformer 23 will be driven to negative saturation as indicated by $-B_s$ in FIG. 2. This circuit is a free-running multivibrator whose frequency of oscillation is determined by the time required to drive the saturable reactor core between the negative and positive saturation levels, (5) $$F = \tfrac{1}{2}T$$

where F is the frequency of oscillation and T is the period of one half cycle. Substituting from Equation 4 we get:

(6) $$F = \frac{E_x}{4\phi_s N_x} \times 10^8$$

In a practical embodiment it has been found convenient to operate the multivibrator at a frequency of around 25,000 cycles per second. When operating at such a frequency, to assure high speed switching a lead network such as that provided by resistor capacitance combinations 16 and 17 and 21 and 22 should be provided in the transistor base circuits as indicated in FIG. 1. The component values of such a network will vary with frequency of operation; typical values for operation at 25,000 cycles are given in the typical parts list furnished as part of this disclosure. The output of the embodiment shown in FIG. 1 will be a square wave with a peak amplitude equal to $nE_x$ where n is the turns ratio of either output winding 23a or 23b to control winding 23c or 23d respectively.

If a modulating input voltage $e_1(t)$ is fed to the input terminals 13 and 14 of transformer 12, the operation will be the same as before except that while transistor 10 conducts, the voltage across winding 23c will be $E_x + e_1(t)$ and while transistor 11 conducts, the voltage across winding 23d will be $E_x - e_1(t)$. That this is true can obviously be seen as the modulating voltage appearing across the portion of the secondary of transformer 12 between the center tap and one end of this secondary will be 180° out of phase with that appearing between the other end of this winding and the center tap, one being the mirror image of the other. These opposite and equal voltages will appear in series with the output of direct-current source 15, the algebraic sums of each of these voltages and the direct-current source being impressed across windings 23c and 23d respectively. This will produce a nonsymmetrical output with the alternating half cycles having periods as follows:

(7) $$T_1 = \frac{2\phi_s N_{x1}}{E_x + e_1(t)} \times 10^{-8} \text{ seconds}$$

(8) $$T_2 = \frac{2\phi_s N_{x2}}{E_x - e_1(t)} \times 10^{-8} \text{ seconds}$$

where $T_1$ is the time of conduction of transistor 10 and $T_2$ is the time of conduction of transistor 11, $N_{x1}$ is the number of turns in winding 23c and $N_{x2}$ is the number of turns in winding 23d.

Figure 3:
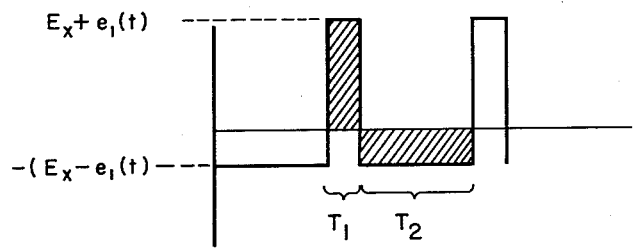
FIG. 3 is a diagram illustrating a typical output signal generated by the device of this invention.

Referring now to FIG. 3 which shows the output wave for such operation, assuming $e_1(t)$ varies only slightly during a given period, the areas of the alternate half cycles remain equal with times of conduction being $T_1$ shown in Equation 7 and $T_2$ shown in Equation 8.

The peak value of $e_1(t)$ must always be less than $E_x$. Otherwise, oscillation will cease. If $e_1(t)$ were equal to $E_x$, there would at one time be zero voltage on the system and therefore no flux change or base drive to turn the transistors on and off. A practical upper limit for the peak value of $e_1(t)$, the modulating voltage has been found to be around $.7E_x$. Thus $E_x$ may be selected for at least $1.4\times$ the peak expected value of $e_1(t)$. The transistors must be capable of blocking $2E_x$. The source impedance of $e_1(t)$ should be 1 kilohm or less for the best performance.

While this first embodiment has been shown utilizing p-n-p transistors, n-p-n types can be used to equal advantage by the appropriate reversal of polarity of the connections to the transistors. Vacuum tubes may also be utilized, the grid of the tube substituting for the base electrode and the anode and cathode for the emitter and collector respectively. Such a substitution can be accomplished with normal design engineering skill.

Figure 4:
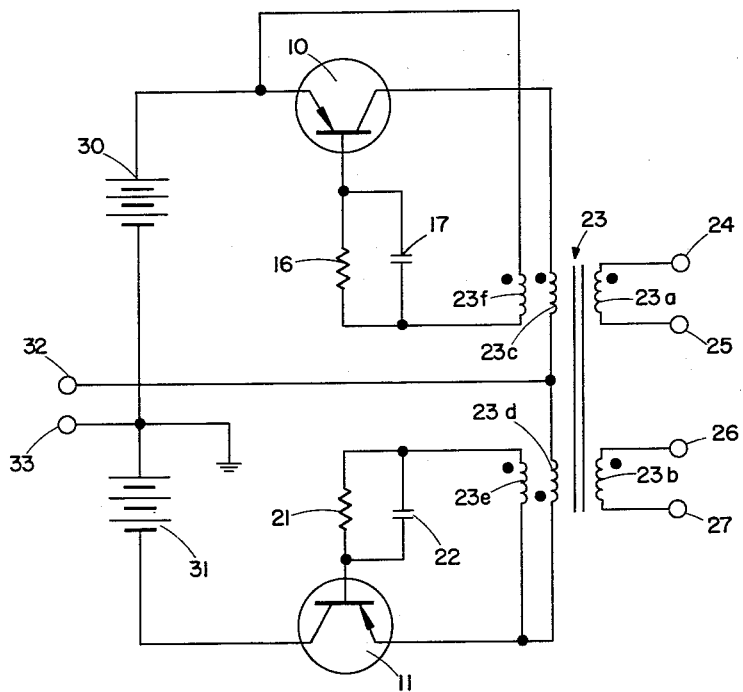
FIG. 4 is a schematic diagram of a second embodiment of the invention.

Referring now to FIG. 4 which is a schematic diagram of a second embodiment of the invention, operation and arrangement are the same as that described for the first embodiment except that the supply circuitry is changed to allow for modulation by a varying direct-current signal rather than an alternating-current signal. The direct-current modulating signal is fed in between terminals 32 and 33. Two direct-current sources 30 and 31 are required. As can be seen, the direct-current modulating signal input will have the same polarity as one of the direct-current sources and the opposite polarity of the other as fed in series with control windings 23c and 23d. If $e_1(t)$ is again considered as the modulating voltage input and $E_x$ as the direct-current source, the times of conduction of transistor 10, as represented by $T_1$ in Equation 7 and the time of conduction of transistor 11 as represented by $T_2$ in Equation 8, will now be as follows:

$$(9) \quad T_1 = \frac{2\phi N_{x1}}{e_1(t) + E_x} \times 10^{-8} \text{ seconds}$$

$$(10) \quad T_2 = \frac{2\phi N_{x1}}{e_1(t) - E_x} \times 10^{-8} \text{ seconds}$$

It thus can be seen that the same type of pulse width modulation signal as indicated in FIG. 3 can be obtained where the modulating signal is a varying direct current rather than an alternating current, the only change being that the peak amplitudes of positive and negative half cycles are now $e_1(t)+E_x$ and $-(e_1(t)-E_x)$.

Typical component values for both embodiments of this invention with a free-running multivibrator frequency of about 25,000 cycles might be as follows:

Transistors 10 and 11___. Type 2N158.
Direct-current power
   sources 15, 30, and 31. 25 volts.
Resistors 16 and 21_____ 1K, ½ watt.
Capacitors 17 and 22___ .003 mfd.
Transformer 23_____ Core consisting of 10 wraps of ½ mil. x ⅛" 4–79 Mo Permalloy; windings 23c and 23d—775 turns each; windings 23e and 23f—55 turns each; windings 23a and 23b—55 turns each.
Transformer 12_____ A.-C. input transformer capable of transforming modulating voltage input to 10 volts R.M.S. either side of secondary center tap.

Test runs on the embodiments shown in both FIGS. 1 and 4 indicate extremely linear output and little or no variation in such output with temperature.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulse width modulator, a saturable reactor free running multivibrator having first and second electronic valves, first and second current sources connected to cause said valves to conduct alternately, a modulating signal source connected to said first valve in series circuit with said first current source, said second current source being connected in series circuit with said modulating signal and said second valve in opposite polarity relationship to said modulating signal as compared with said first current source connections, whereby the conduction periods of said valves vary in inverse relationship to each other in response to said modulating signal.

2. A pulse width modulator comprising a saturable reactor having two sets of feedback, control, and output windings, a first and second electronic valve having positive, negative, and control electrodes, a modulating signal source, a first current source connected intermediate said positive and negative electrodes of said first electronic valve in series circuit with one of said control windings and said modulating signal source, and a second current source connected intermediate said positive and negative electrodes of said second electronic valve in series circuit with said other control winding and said modulating signal source in opposite polarity relationship to said modulating signal as compared with said first source connections, said feedback windings being separately connected intermediate said control electrodes and one of said other electrodes of said first and second electronic valves respectively.

3. In a pulse width modulator, a saturable reactor having a plurality of windings, first and second transistors having emitter, collector, and base electrodes, a pair of modulation signal input terminals, a first direct current source connected between the emitter electrode of said first transistor and ground, one of said modulation input terminals being grounded, a second direct current source connected between the collector electrode of said second transistor and ground, the grounded terminal of said second direct current source being of opposite polarity to the grounded terminal of said first direct current source, a first one of said reactor windings being connected between the collector of said first transistor and the other of said modulation input terminals, a second one of said saturable reactor windings being connected between the emitter of said second transistor and the other of said modulation input terminals, a third one of said saturable reactor windings being connected between the emitter and the base of said first transistor, a fourth one of said saturable reactor windings being connected between the base and emitter of said second transistor, and output terminals connected to a fifth one of said windings, whereby said modulator is capable of receiving unbalanced unipolar and bipolar modulation signals and producing a pulse width modulated A.-C. signal therefrom.

References Cited in the file of this patent

UNITED STATES PATENTS

| | | |
|---|---|---|
| 2,780,782 | Bright | Feb. 5, 1957 |
| 2,783,384 | Bright et al. | Feb. 26, 1957 |
| 2,785,236 | Bright et al. | Mar. 12, 1957 |
| 2,812,390 | Van Overbeek | Nov. 5, 1957 |
| 2,812,437 | Sziklai | Nov. 5, 1957 |
| 2,826,731 | Paynter | Mar. 11, 1958 |
| 2,886,764 | Zelina | May 12, 1959 |